United States Patent
Shkuratoff

[11] Patent Number: 5,896,647
[45] Date of Patent: Apr. 27, 1999

[54] SEALED ELECTRICAL DEVICE WITH UNITARY FILL PORT AND TERMINAL CONSTRUCTION

[75] Inventor: Allen Shkuratoff, North Vancouver, Canada

[73] Assignee: NEC Moli Energy (Canada) Limited, Maple Ridge, Canada

[21] Appl. No.: 08/867,831

[22] Filed: Jun. 2, 1997

Related U.S. Application Data

[62] Division of application No. 08/450,118, May 25, 1995, abandoned.

[30] Foreign Application Priority Data

Sep. 9, 1994 [CA] Canada ................................. 2131777

[51] Int. Cl.⁶ ..................................................... H01M 2/00
[52] U.S. Cl. ........................ 29/623.2; 429/172; 429/174; 429/185
[58] Field of Search ........................... 29/623.2; 429/172, 429/174, 185

[56] References Cited

U.S. PATENT DOCUMENTS

| | | | |
|---|---|---|---|
| 3,307,086 | 2/1967 | Propps | 136/177 |
| 3,809,580 | 5/1974 | Jagid | 136/133 |
| 3,834,942 | 9/1974 | Tietze | 136/14 |
| 3,939,011 | 2/1976 | Zaleski | 429/174 |
| 4,233,372 | 11/1980 | Bro et al. | 317/230 |
| 4,517,736 | 5/1985 | Groebel | 29/623.2 |
| 4,559,283 | 12/1985 | Kruger et al. | 429/174 |
| 4,700,468 | 10/1987 | Volkhin et al. | 29/623.2 |
| 5,588,970 | 12/1996 | Hughett et al. | 29/623.2 |

FOREIGN PATENT DOCUMENTS

| | | |
|---|---|---|
| 993946 | 7/1976 | Canada . |
| 3240806 A1 | 5/1984 | Germany . |
| 62-264563 | 11/1987 | Japan . |
| 2-15559 | 1/1990 | Japan . |
| A-1518483 | 7/1978 | United Kingdom . |

*Primary Examiner*—Kishor Mayekar
*Attorney, Agent, or Firm*—Synnestvedt & Lechner

[57] ABSTRACT

Unitary fill port and terminal constructions and methods for filling and sealing are disclosed for electrical devices comprising liquids. The invention is particularly suited for use in prismatic batteries comprising non-aqueous organic electrolytes.

8 Claims, 3 Drawing Sheets

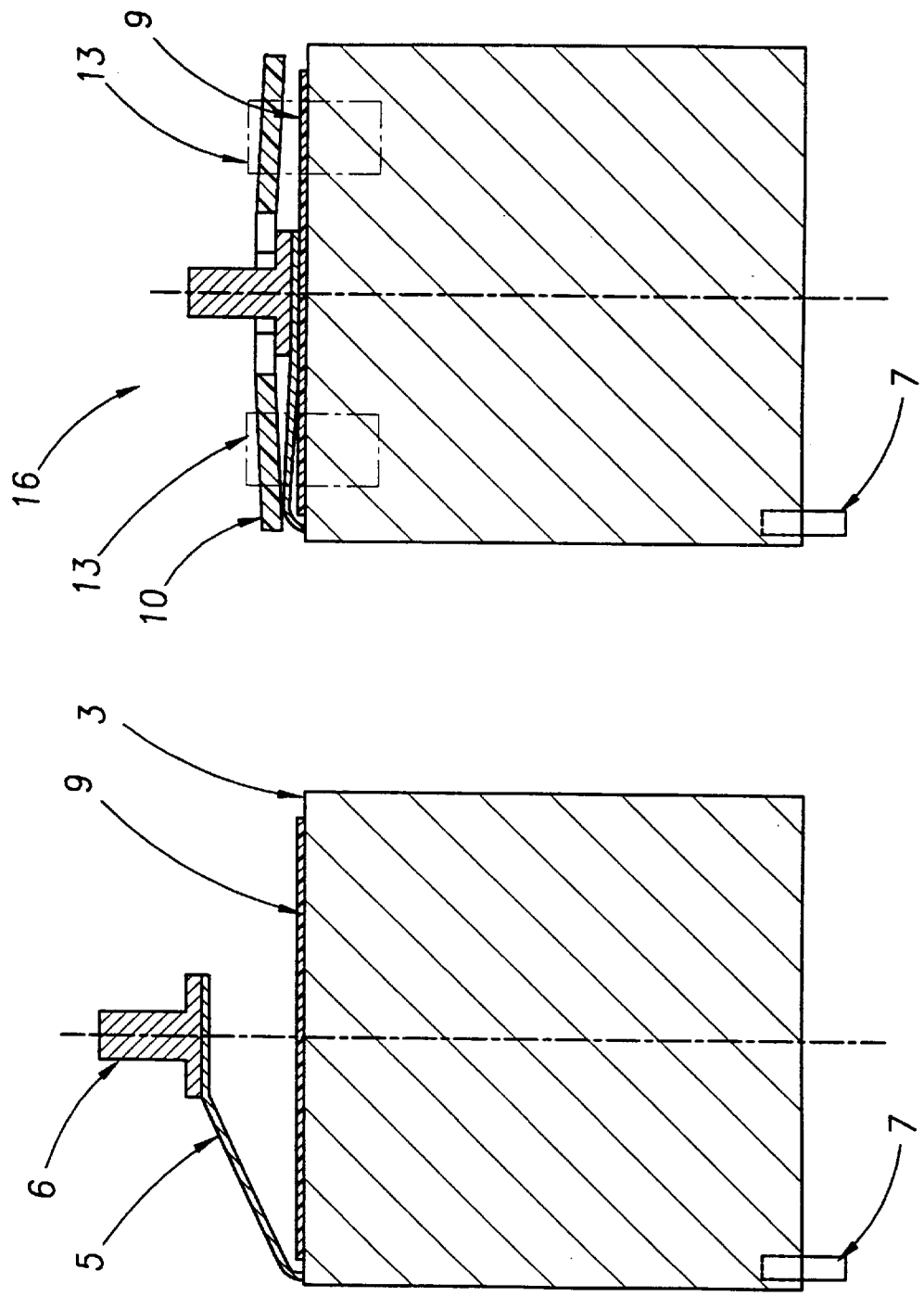

SEALED ELECTRICAL DEVICE WITH UNITARY FILL PORT AND TERMINAL CONSTRUCTION

This is a division, of application Ser. No. 08/450,118 filed May 25, 1995, now abandoned.

FIELD OF THE INVENTION

The invention pertains to fill port and terminal constructions for electrical devices and, in particular, for batteries or capacitors comprising organic electrolytes.

BACKGROUND OF THE INVENTION

Various commercial electrical devices contain internal components that must be shielded from the surrounding environment to prevent degradation. Additionally, some such devices also contain liquid components that must be incorporated in the device during manufacture but may evaporate afterwards unless the device is well sealed thereafter. Electrolytic capacitors and batteries are examples of such devices. Recently, new long life types of lithium non-aqueous batteries have become commercially available based on what is known as rocking chair or lithium ion electrochemistries. These batteries typically contain liquid organic electrolytes comprising solvent mixtures of esters, ethers, and the like. Difficulties exist, however, in adapting prior art filling methods with conventional container and terminal constructions when attempting to mass produce such batteries.

Often, commercial capacitors and batteries employ a deep drawn metal container that acts both as a container and as one of the electrical terminals for the device. The operating internal components of the device can be inserted into the container as an assembly, and a cover comprising an electrical feedthrough can then be employed to seal the device wherein the feedthrough acts as the other electrical terminal.

Conventional aqueous cylindrical batteries (eg. AA size alkaline batteries) employ a cylindrical metal container and metal cover construction wherein the cover is crimp sealed to the container using an insulating plastic gasket. Therefore, the cover itself acts as a feedthrough and terminal in this construction. Filling of the electrolyte is accomplished simply by dripping the liquid into the partly assembled battery comprising the container and internal electrical assembly. Generally, the electrolyte is added at a rate such that the liquid can be absorbed by the internal electrical assembly without ever creating a significant head. Otherwise, the liquid could wet the surfaces to be crimp sealed and thereby foul the seal itself. The appropriate electrical connection between the internal assembly and the cover may be made before or after the filling operation.

The aforementioned construction and filling method can be adopted successfully for non-aqueous lithium ion batteries. However, the typical electrolyte viscosity and the porous nature of the typical solid internal electrical assembly is such that the electrolyte must be added very slowly to avoid wetting the crimp seal surfaces. Even when the solid internal assembly is evacuated beforehand, this filling process can take of order of half an hour.

Prismatic batteries (ie. rectangular parallelepiped shape) are generally preferred for many applications but are somewhat more difficult to make. The manufacture of prismatic batteries can have many similarities to that of the aforementioned cylindrical batteries, but it is generally impossible to effect a satisfactory crimp seal using a rectangular cover. Thus, a weld is often employed to join cover and container in this case, and consequently the cover cannot be used as a second terminal (since it is electrically connected to the container via the weld). A feedthrough, remote from the welded cover periphery, is thus needed to act as a second terminal and is typically located and fabricated in the cover as a subassembly (ie. prior to wetting). Such feedthroughs can be a glass-metal seal type or a rivet seal type (such as the crimp seal design employing a rivet described in German Patent Application 3240806A1). The electrolyte filling operation thus can be performed as described previously, followed by a welding of the cover rather than a crimping.

It is undesirable however to perform high temperature welding operations in the presence of flammable non-aqueous liquids. Thus, filling of prismatic batteries with non-aqueous solvents is desirably performed after welding the cover in place. A means of dealing with this problem has been to construct pseudo-prismatic batteries having gentle curves which replace the right angle corners in the periphery of the cover (ie. rectangular covers with rounded corners). However, this construction sacrifices battery volume that is preferably used to the maximum in most applications.

Alternately, other means can be provided for filling after the joining of cover to container, such as that described in Canadian Patent No. 993,946 wherein a septum seal is effected in the cover as a subassembly (ie. the cover acts as a terminal and comprises a resealable septum as the fill port). Electrolyte is added via syringe through said septum after hermetically sealing the battery. Another approach is to provide a separate fill tube for addition of electrolyte after joining the cover and container. The fill tube can be severed and cold welded shut thereafter (as described in U.S. Pat. No. 3,809,580). However, such alternatives require additional parts thereby increasing complexity, external battery volume, cost, etc.

SUMMARY OF THE INVENTION

The instant invention provides for the filling of a conventional electrical device through a fill port that subsequently is used as part of an electrical terminal assembly. Thus, both an electrical device and a method for filling and sealing said device are disclosed.

Specifically, a sealed electrical device is disclosed that has an internal electrical assembly including a liquid; a metal container originally open at one end that contains the internal electrical assembly, the container acting as a first electrical terminal; a metal cover sealed at the periphery to the open end of the container; a liquid fill port on the outer surface of the device; and a second terminal on the outer surface of the device wherein the improvement comprises a unitary assembly comprising the fill port and second terminal, the assembly being remote from the seal at the periphery of the cover.

The fill port and second terminal assembly can further comprise an outwardly disposed annular section wherein the annular section acts as the fill port; an annular sealing gasket within the annular section in sealing contact with the inner surface of said section; and a metal feedthrough central to said gasket and in sealing contact with the inner surface of said gasket wherein the feedthrough acts as a portion of the second terminal.

The annular section of the aforementioned assembly can be crimp sealed to said gasket. (Herein, crimp sealing is taken to mean inelastically deforming the annular section against the gasket thereby compressing the gasket and establishing sealing contact between the inner surface of the section and the outer surface of the gasket and between the inner surface of the gasket and the outer surface of the feedthrough.)

One possible embodiment of the device of the invention comprises a generally cylindrically shaped fill port and second terminal assembly. Thus, the components making up said assembly (ie. the annular section, the gasket, and the feedthrough) can be cylindrically shaped. It may be advantageous to also provide an outward step at the outermost end of the gasket such that the outer end of the annular section locates against the step. The gasket can be made of polyolefin and the feedthrough can be made of aluminum.

The container may comprise the unitary fill port and second terminal assembly in the aforementioned embodiments of the device. In particular, the container may be prismatic shaped and may comprise the unitary fill port and second terminal assembly on the face opposite the open end. Alternately, the cover may comprise the unitary fill port and second terminal assembly in the aforementioned embodiments of the device. In either case, the periphery of the cover may be welded to the open end of the container.

The invention is suited for use in electrical devices such as batteries or capacitors and is particularly useful for prismatic shaped devices. The liquid in the device can be a mixture of organic solvents.

The invention also pertains to a method for filling and sealing an electrical device comprising installing an internal electrical assembly having first and second electrical connectors into a metal container having an open end; connecting the first electrical connector to the container; connecting the second electrical connector to a metal feedthrough; sealing the periphery of a metal cover to the open end of the container; filling the device with a liquid through an outwardly disposed annular section located remote from the seal at the periphery of the cover; positioning an annular sealing gasket in the annular section and peripheral to the feedthrough; and crimp sealing the annular section thereby sealing the inner surface of the annular section to the outer surface of the gasket and the inner surface of the gasket to the outer surface of the feedthrough.

In said method, it can be advantageous for the annular section to be outwardly flared before crimp sealing. The annular section can be crimp sealed into a cylindrical shape or optionally retain a partial flare.

The method of the invention can be adapted for pressure assisted liquid filling prior to the positioning of the gasket. The filling may comprise the steps: mating a nozzle adjacent to the unitary fill port and second terminal assembly; evacuating air from the interior of the partially assembled device through the nozzle; filling the air evacuated device with the liquid through the nozzle; and removing the nozzle.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE SPECIFIC EMBODIMENTS OF THE INVENTION

The invention may be used for various electrical devices but is considered particularly suitable for use in small prismatic batteries for commercial electronics applications. While, the following description pertains specifically to such batteries, it is intended that this additionally serve to illustrate aspects of the invention in general. The invention as disclosed can be adapted accordingly by those skilled in the art.

Figure 1:
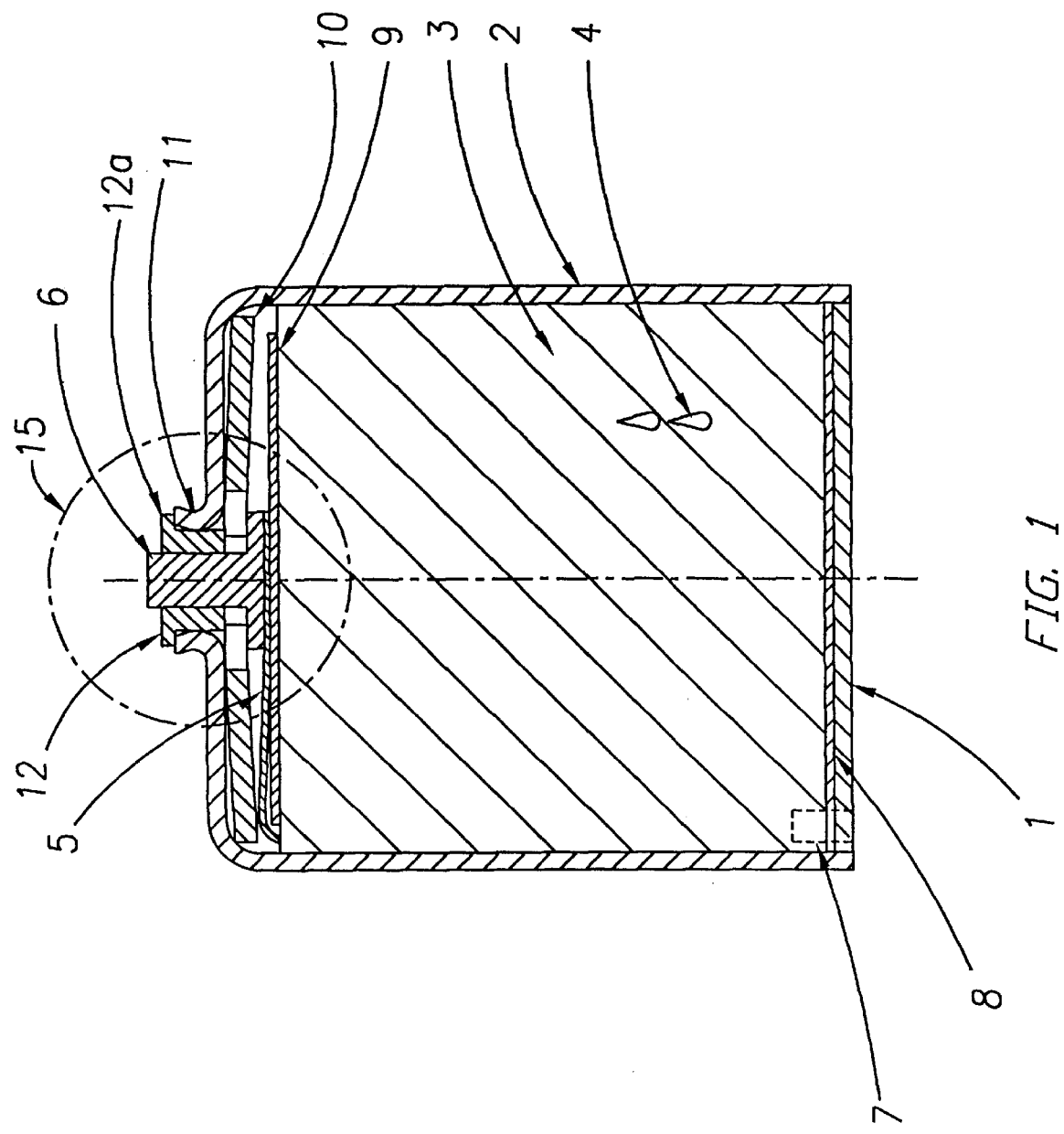
FIG. 1 shows a cross-sectional side view of a prismatic battery comprising the unitary fill port and terminal assembly of the invention.

FIG. 1 shows a cross-sectional view of a prismatic battery comprising the unitary fill port and terminal assembly of the invention. In this case, a lithium ion type battery construction is shown. Therein, a cover 1 is welded at the periphery to a container 2 and together serve to house an internal electrical assembly 3 comprising a winding of electrodes and separator foils, called a jelly square, and an organic liquid electrolyte 4. The electrolyte 4 typically consists of a lithium salt dissolved in a mixture of organic solvents such as esters, ethers, and the like. Electrical connectors are provided to connect the two electrodes of the winding to the terminals. As shown, a positive electrical connector 5 connects the positive electrode to a feedthrough 6. The feedthrough 6 therefore acts as the positive terminal for the battery. Similarly, a negative connector 7 connects the negative electrode to the container 2. The container 2 and cover 1 therefore act as the negative terminal for the battery. To insulate the electrodes and connectors inside the battery, a variety of insulating pieces may be used. Thus, also depicted are lower insulator 8, upper insulator 9, and feedthrough insulator 10.

The unitary fill port and terminal assembly 15 as depicted comprises an outwardly disposed annular section 11 formed in the container 2, an insulating gasket 12, and the feedthrough 6. The gasket 12 acts as a seal and as an insulator to isolate the terminals of the battery from each other. The simple unitary assembly 15 shown is generally cylindrically shaped. However, it may be advantageous for the annular section 11 to be slightly flared as shown in FIG. 1 so as to provide additional strength. The feedthrough 6 is a solid rod having a broadened base that provides a large area upon which to connect positive connector 5. The gasket 12 is shaped like a cylinder and additionally has an outward step 12a at the outermost end for locating against the outer upper end of the annular section 11. The gasket 12 is subjected to inward radial forces provided by the crimped annular section 11, thereby effecting a seal between annular section 11 and gasket 12 and between gasket 12 and feedthrough 6. A bitumen sealant or the like (not shown in FIG. 1) may be applied to the crimp sealed surfaces to effect a more reliable seal.

The battery depicted in FIG. 1 has a minimum number of components and may use conventional electrochemically compatible materials for construction. The unitary assembly 15 must be smaller than the cover 1 but its size is otherwise independent of the size of the cover 1. Thus, the size of the seal area need not become larger with the size of the battery (and hence size of the cover). This may be useful in reducing absolute leak rates through the plastic gasket material itself or for increasing the strength of the crimp seal over that of conventional 'whole cover' crimp seal designs. The size of the unitary assembly 15 may be chosen according to filling operation requirements and/or preferred terminal size.

The design of the battery illustrated in FIG. 1 is relatively straightforward. However, filling a typical lithium ion battery with non-aqueous liquid electrolyte in a reasonably simple and quick manner, combined with sealing the battery reliably thereafter is more difficult. The typical organic liquid permeates the solid internal electrode assembly very slowly under ambient conditions. As mentioned previously, to accelerate this process, the battery is usually air evacuated prior to filling. However, it can still take a significant time for the liquid to permeate the electrode assembly under these conditions. Additionally, only a small amount of head (representing only a fraction of the total liquid required for complete filling) can typically be contained in the partially assembled battery without wetting the surfaces to be sealed. Thus, filling operations that do not wet the sealing surfaces are generally undesirably slow and complex.

The filling operation can be accelerated markedly by use of pressure assisted filling. One such possible method is depicted in FIGS. 2a, b, c, and d which show a simplified overall assembly process flow. Initially, the internal electrical assembly 3 is fabricated and the positive connector 5 is connected to the feedthrough 6 as shown in FIG. 2a. Upper insulator 9 and feedthrough insulator 10 are positioned and secured in place with adhesive tape 13 (shown in dotted lines) to form a unit 16 as shown in FIG. 2b. Unit 16 is installed in a container 2 having an outwardly disposed annular section 11 formed therein opposite its open end. (The annular section 11 is outwardly flared initially. This allows easy insertion of the gasket 12 later (see FIG. 2d). Ultimately, the annular section 11 is crimped radially inwards inelastically, thereby decreasing the flare.) A lower insulator 8 is installed and the negative connector 7 is connected to the container 2. Next, a cover 1 is welded at the periphery to the container 2.

Figure 2C:
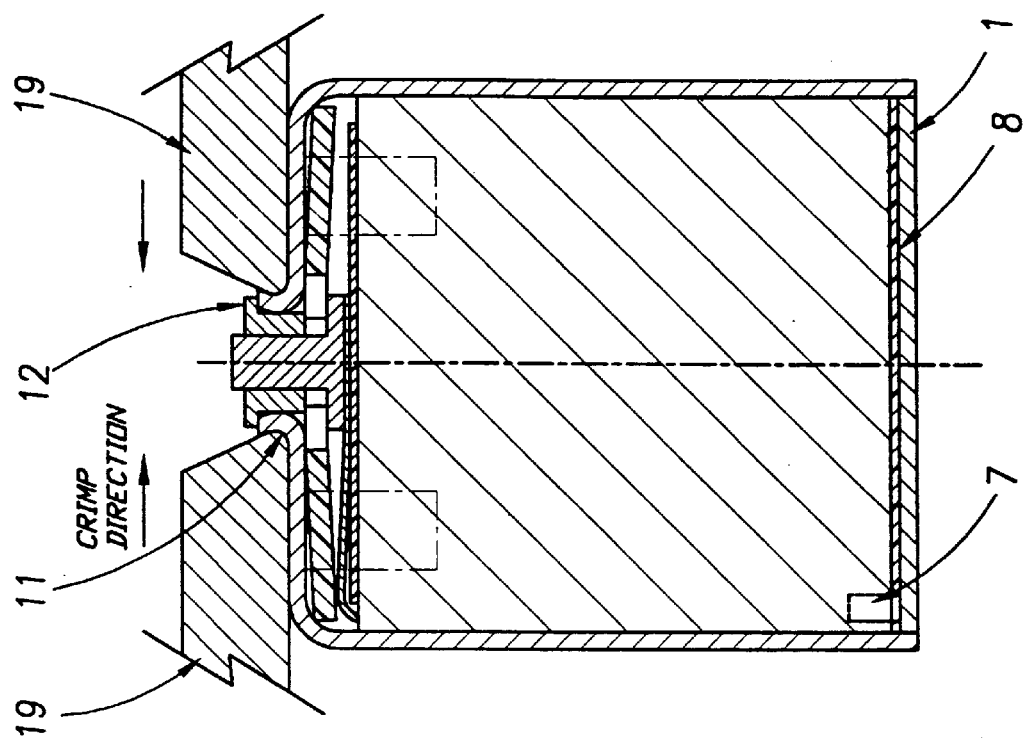
FIGS. 2a, b, c, and d show in sequence a simplified overall assembly process flow for the prismatic battery of FIG. 1.

As shown in FIG. 2c, for filling, a nozzle 17 is mated to the container adjacent to the unitary assembly 15. A seal between nozzle 17 and container 2 is made via O-ring 18. The partially assembled battery is then evacuated and liquid is introduced under vacuum. Either a metered amount or an excess amount of liquid may be introduced (the latter requiring an excess removal step later) which forms a significant head thereby wetting those surfaces inside the boundaries defined by the nozzle 17 and O-ring 18. The head of liquid electrolyte is driven into the battery with pressure assist when the system is returned to ambient pressure. (Alternately, pressure above ambient may be provided if desired.)

Figure 2D:
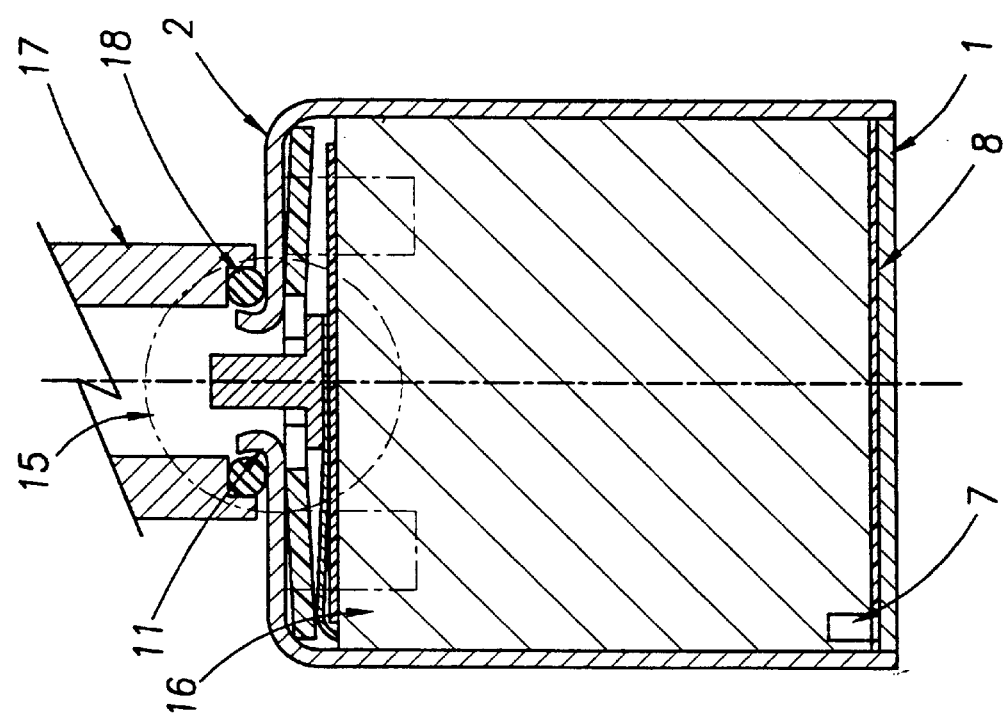

Finally, as shown in FIG. 2d, the nozzle 17 is removed, the gasket 12 is positioned, and the annular section 11 is crimped radially inwards using conventional crimping equipment 19 thereby deforming the gasket 12 and effecting a seal. The external surfaces of the battery are cleaned afterwards to remove traces of liquid electrolyte (typically in aqueous ultrasonic cleaning bath).

The preceding procedure results in a crimp seal wherein the sealing surfaces had been wetted prior to crimping. However, as shown in the illustrative examples to follow, often a satisfactory crimp seal can be made even under these conditions.

Other configurations or components are possible for the devices of the invention. For example, it may be desirable for certain reasons to incorporate the unitary fill port and second terminal assembly in the cover rather than the container. In this case, the cover can be welded at the periphery without fear of damage to the plastic gasket, since the gasket is installed at a later stage. This is particularly advantageous in compact designs wherein the cover periphery is close to the second terminal.

EXAMPLE 1

Approximately 10 unitary fill port and terminal assemblies were fabricated in a closed end of conventional prismatic container pieces but otherwise as generally shown in the preceding Figures. The gasket was made of polypropylene and the feedthrough was made of aluminum. (No internal electrical assemblies were present and no sealant was used.) The open end of the containers was used to hook up to the vacuum inlet of a conventional helium leak detector set to a sensitivity of $10^{-6}$ atm cm$^3$/sec. No leaks could be detected at the unitary fill port and terminal assembly for any of these prismatic assemblies.

EXAMPLE 2

Five hundred (500) conventional cylindrical 4/3 A size non-aqueous lithium ion batteries were fabricated wherein filling was accomplished using a pressure assist method similar to that described in the preceding. Thus, a cover and gasket subassembly was attached to an internal current collecting tab and suspended above the partially assembled battery. (In this example, the sealing surfaces were coated with a small amount of sealant beforehand.) Then a nozzle was mated to the container, the battery was evacuated and liquid electrolyte was added so as to flood the battery and nozzle. Excess electrolyte was removed and the cover was crimped in place. The batteries were ultrasonically cleaned afterwards in water. Each battery was leak tested by determining the weight loss for each after subjecting them to a stringent thermal shock test. Weight losses were similar for batteries having conventional satisfactory crimp seals. (The thermal shock test consists of ramping to $-40°$ C. over a period of 1 hour, storing thereafter for 1 hour, ramping to 80° C. again over a period of 1 hour, storing at 80° C. for 1 hour and repeating this cycle continously 26 times.)

The preceding examples demonstrate that a satisfactory seal can be achieved using the fill port and terminal assembly of the invention and conventional methods of assembly (ie. without wetting the parts) and that a satisfactory seal can be expected using the method of the invention (ie. wetting of the parts is involved).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for filling and sealing an electrical device constructed of a metal container originally having an open end and a substantially closed end, an internal electrical assembly having first and second electrical connectors, a metal cover with a periphery therearound closing the open end, an annular insulating, sealing gasket with an opening therein, and a metal feedthrough passing through the opening in the gasket, said method comprising in sequence order:

providing an internal electrical assembly having first and second electrical connectors and a metal container originally having an open end and a substantially closed end;

connecting a metal feedthrough through said second electrical connector;

installing said internal electrical assembly with the connected metal feedthrough into said metal container;

connecting the first electrical connector to the container;

sealing the periphery of the metal cover to the open end of the container;

filling the device with a liquid through a fill port having an outwardly disposed annular section defined by a face of the container opposite to the open end, or by the cover at a distance from the seal of the periphery of the cover;

positioning an annular insulating, sealing gasket in the annular section and peripheral to the feedthrough so that the feedthrough passes through the opening in the gasket; and crimp sealing the annular section to seal an inner surface of the annular section to an outer surface of the gasket and an inner surface of the gasket to an outer surface of the feedthrough.

2. A method as claimed in claim 1 wherein the annular section is outwardly flared before crimp sealing.

3. A method as claimed in claim 2 wherein the annular section is crimp sealed into a cylindrical shape with a slight residual outward flare.

4. A method as claimed in claim 1 wherein the filling is pressure assisted and comprises the following steps prior to the positioning of the gasket:

mating a nozzle adjacent to the fill port;

evacuating the partially assembled device through the nozzle;

filling the evacuated device with the liquid through the nozzle; and removing the nozzle.

5. A method as claimed in claim 1 including shaping the gasket in the form of a cylinder.

6. A method as claimed in claim 5 including forming the gasket to include an outward step having an outward side and an underside at the exterior end of said gasket and locating an outer end of said annular section against said underside of said step.

7. A method as claimed in claim 1 including forming the feedthrough in the shape of a cylindrical rod.

8. A method as claimed in claim 1 including forming the container as a prism with the fill port on a face of the container opposite the open end.

* * * * *

UNITED STATES PATENT AND TRADEMARK OFFICE
CERTIFICATE OF CORRECTION

PATENT NO. : 5,896,647

DATED : April 27, 1999

INVENTOR(S) : Shkuratoff

It is certified that error appears in the above-indentified patent and that said Letters Patent is hereby corrected as shown below:

Column 6, line 66, change "of" to - - at - - .

Signed and Sealed this

Twenty-eighth Day of September, 1999

Attest:

Q. TODD DICKINSON

Attesting Officer

Acting Commissioner of Patents and Trademarks